United States Patent
Uhm et al.

(10) Patent No.: US 11,645,821 B2
(45) Date of Patent: *May 9, 2023

(54) ELECTRONIC DEVICE FOR ADJUSTING POSITION OF CONTENT DISPLAYED ON DISPLAY BASED ON AMBIENT ILLUMINANCE AND METHOD FOR OPERATING SAME

(71) Applicant: Samsung Electronics Co., Ltd., Gyeonggi-do (KR)

(72) Inventors: Junwhon Uhm, Gyeonggi-do (KR); Yunguk Lee, Gyeonggi-do (KR); Seungnyun Kim, Gyeonggi-do (KR); Yongsang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/473,458

(22) Filed: Sep. 13, 2021

(65) Prior Publication Data

US 2021/0409673 A1    Dec. 30, 2021

Related U.S. Application Data

(63) Continuation of application No. 16/388,059, filed on Apr. 18, 2019, now Pat. No. 11,122,254.

(30) Foreign Application Priority Data

May 18, 2018    (KR) .......................... 10-2018-0057208

(51) Int. Cl.
  *G06T 19/00*    (2011.01)
  *H04N 13/239*    (2018.01)
  (Continued)

(52) U.S. Cl.
  CPC .......... *G06T 19/006* (2013.01); *G02B 27/017* (2013.01); *G06F 3/0484* (2013.01);
  (Continued)

(58) Field of Classification Search
  None
  See application file for complete search history.

(56) References Cited

U.S. PATENT DOCUMENTS

| 5,880,734 A | 3/1999 | Light |
| 8,749,478 B1 | 6/2014 | Bowen |

(Continued)

FOREIGN PATENT DOCUMENTS

| CN | 1926605 | 3/2007 |
| CN | 101030364 | 9/2007 |

(Continued)

OTHER PUBLICATIONS

International Search Report dated Aug. 27, 2019 issued in counterpart application No. PCT/KR2019/005855, 10 pages.

(Continued)

*Primary Examiner* — Jwalant Amin
(74) *Attorney, Agent, or Firm* — The Farrell Law Firm, P.C.

(57) ABSTRACT

Disclosed is an electronic device including at least one sensor, a first display configured to output a first image corresponding to content for a left eye of a user and a second display configured to output a second image corresponding to the content for a right eye of the user, and a processor configured to display, using the first display and the second display, the content in a virtual display region through a glass plate of the smart glass, identify a state of the smart glass using the at least one sensor, based on identifying that a sensor value of the at least one sensor indicating the state of the smart glass is less than a preset value, adjust at least (Continued)

one of a display position or a size of the content in the virtual display region such that the content is displayed in a first display region corresponding to a first field of view (FOV) of a user that is narrowed according to the state of the smart glass, and based on identifying that the sensor value is greater than the preset value, adjust the at least one of the display position or the size of the content in the virtual display region such that the content is displayed in a second display region corresponding to a second FOV of the user that is broadened according to the state of the smart glass, the second FOV having a broader view angle and a shorter focal length than the first FOV.

12 Claims, 12 Drawing Sheets

(51) Int. Cl.
    *H04N 13/383*     (2018.01)
    *H04N 13/139*     (2018.01)
    *H04N 13/156*     (2018.01)
    *H04N 13/279*     (2018.01)
    *H04N 13/344*     (2018.01)
    *G02B 27/01*     (2006.01)
    *G06F 3/0484*     (2022.01)

(52) U.S. Cl.
    CPC ......... *H04N 13/139* (2018.05); *H04N 13/156* (2018.05); *H04N 13/239* (2018.05); *H04N 13/279* (2018.05); *H04N 13/344* (2018.05); *H04N 13/383* (2018.05); *G02B 2027/0183* (2013.01)

(56) References Cited

U.S. PATENT DOCUMENTS

| | | |
|---|---|---|
| 2002/0067366 A1 | 6/2002 | Hirao et al. |
| 2005/0212824 A1 | 9/2005 | Marcinkiewicz et al. |
| 2007/0115435 A1 | 5/2007 | Rosendaal |
| 2007/0146356 A1 | 6/2007 | Ladouceur |
| 2010/0103186 A1* | 4/2010 | Luengen ................ G06F 9/451 345/589 |
| 2011/0227717 A1 | 9/2011 | Kumon |
| 2012/0242678 A1 | 9/2012 | Border |
| 2012/0315022 A1 | 12/2012 | Nagasawa et al. |
| 2013/0069924 A1 | 3/2013 | Robinson et al. |
| 2013/0141435 A1 | 6/2013 | Cho |
| 2013/0335402 A1 | 12/2013 | Eriksson |
| 2014/0192092 A1 | 7/2014 | Aruga et al. |
| 2015/0015608 A1 | 1/2015 | Park |
| 2015/0168720 A1 | 6/2015 | Oh et al. |
| 2016/0139411 A1 | 5/2016 | Kang et al. |
| 2017/0269684 A1 | 9/2017 | Murai |
| 2018/0004020 A1 | 1/2018 | Kunii |

FOREIGN PATENT DOCUMENTS

| | | |
|---|---|---|
| CN | 102224443 | 10/2011 |
| CN | 106999034 | 8/2017 |
| CN | 107203044 | 9/2017 |
| EP | 2 565 865 | 3/2013 |
| JP | 2013-007827 | 1/2013 |
| JP | 2015-152746 | 8/2015 |
| KR | 1020090116899 | 11/2009 |
| KR | 10-2015-0008733 | 1/2015 |
| KR | 10-1511587 | 4/2015 |
| KR | 10-1610169 | 4/2016 |
| KR | 10-2018-0000912 | 1/2018 |

OTHER PUBLICATIONS

European Search Report dated Nov. 9, 2020 issued in counterpart application No. 19802667.6-1208, 14 pages.
Chinese Office Action dated Dec. 28, 2021 issued in counterpart application No. 201980031406.7, 31 pages.
Korean Office Action dated Mar. 16, 2022 issued in counterpart application No. 10-2018-0057208, 9 pages.
European Search Report dated Mar. 1, 2023 issued in counterpart application No. 22211682.4-1208, 12 pages.

* cited by examiner

ELECTRONIC DEVICE FOR ADJUSTING POSITION OF CONTENT DISPLAYED ON DISPLAY BASED ON AMBIENT ILLUMINANCE AND METHOD FOR OPERATING SAME

CROSS-REFERENCE TO RELATED APPLICATION(S)

This application is a Continuation Application of U.S. patent application Ser. No. 16/388,059, filed on Apr. 18, 2019, and is based on and claims priority under 35 U.S.C. § 119 to Korean Patent Application Serial No. 10-2018-0057208, filed on May 18, 2018, in the Korean Intellectual Property Office, the entire disclosures of which are incorporated herein by reference.

BACKGROUND

1. Field

The present disclosure relates generally to electronic devices that adjust the position of content displayed on a display and methods for operating the same.

2. Description of Related Art

As electronic devices are highly integrated, and high-speed, high-volume wireless communication technology advances, electronic devices come equipped with various functions. For example, electronic devices come with integrated functionality, including entertainment functions, such as playing video games, multimedia functions, replaying music/videos, communication and security functions for mobile banking, and scheduling or e-wallet functions.

Advancing display and battery performance has led to the development of more compact and portable electronic devices. For example, head-mounted or other various wearable electronic devices are being introduced.

Recently, electronic devices are providing more diversified services and additional functions. Also being developed is a diversity of applications runnable on portable devices. Head-mounted devices, wearable devices, or other various portable electronic devices are coming into use to meet user demand.

A head-mounted portable device may display augmented reality (AR) images. A head-mounted portable device may output an AR image in an unchanged display region regardless of ambient illuminance or movement speeds.

The user's view angle may be varied by ambient illuminance or movement speeds due to differences in features between the periphery and center of the retina. For example, the user may need to shift their gaze to a display region where an image is output as ambient illuminance or movement speed varies. When no change is made to the image due to ambient illuminance or movement speed, the user who steadily gazes at the AR image may suffer from fatigue, pupil damage, or other safety issues due to a delay in gaze shift.

SUMMARY

The present disclosure has been made to address at least the disadvantages described above and to provide at least the advantages described below.

In accordance with an aspect of the present disclosure, an electronic device is provided. The electronic device includes at least one sensor, a first display configured to output a first image corresponding to content for a left eye of a user and a second display configured to output a second image corresponding to the content for a right eye of the user, and a processor configured to display, using the first display and the second display, the content in a virtual display region through a glass plate of the smart glass, identify a state of the smart glass using the at least one sensor, based on identifying that a sensor value of the at least one sensor indicating the state of the smart glass is less than a preset value, adjust at least one of a display position or a size of the content in the virtual display region such that the content is displayed in a first display region corresponding to a first field of view (FOV) of a user that is narrowed according to the state of the smart glass, and based on identifying that the sensor value is greater than the preset value, adjust the at least one of the display position or the size of the content in the virtual display region such that the content is displayed in a second display region corresponding to a second FOV of the user that is broadened according to the state of the smart glass, the second FOV having a broader view angle and a shorter focal length than the first FOV.

In accordance with another aspect of the present disclosure, a method of operating a smart glass includes displaying, using a first display and a second display included in the smart glass, content in a virtual display region through a glass plate of the smart glass, the first display outputting a first image corresponding to the content for a left eye of a user and the second display outputting a second image corresponding to the content for a right eye of the user, identifying a state of the smart glass using at least one sensor included in the smart glass, based on identifying that a sensor value of the at least one sensor indicating the state of the smart glass is less than a preset value, adjusting at least one of a display position or a size of the content in the virtual display region such that the content is displayed in a first display region corresponding to a first field of view (FOV) of a user that is narrowed according to the state of the smart glass, and based on identifying that the sensor value is greater than the preset value, adjusting the at least one of the display position or the size of the content in the virtual display region such that the content is displayed in a second display region corresponding to a second FOV of the user that is broadened according to the state of the smart glass, the second FOV having a broader view angle and a shorter focal length than the first FOV.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
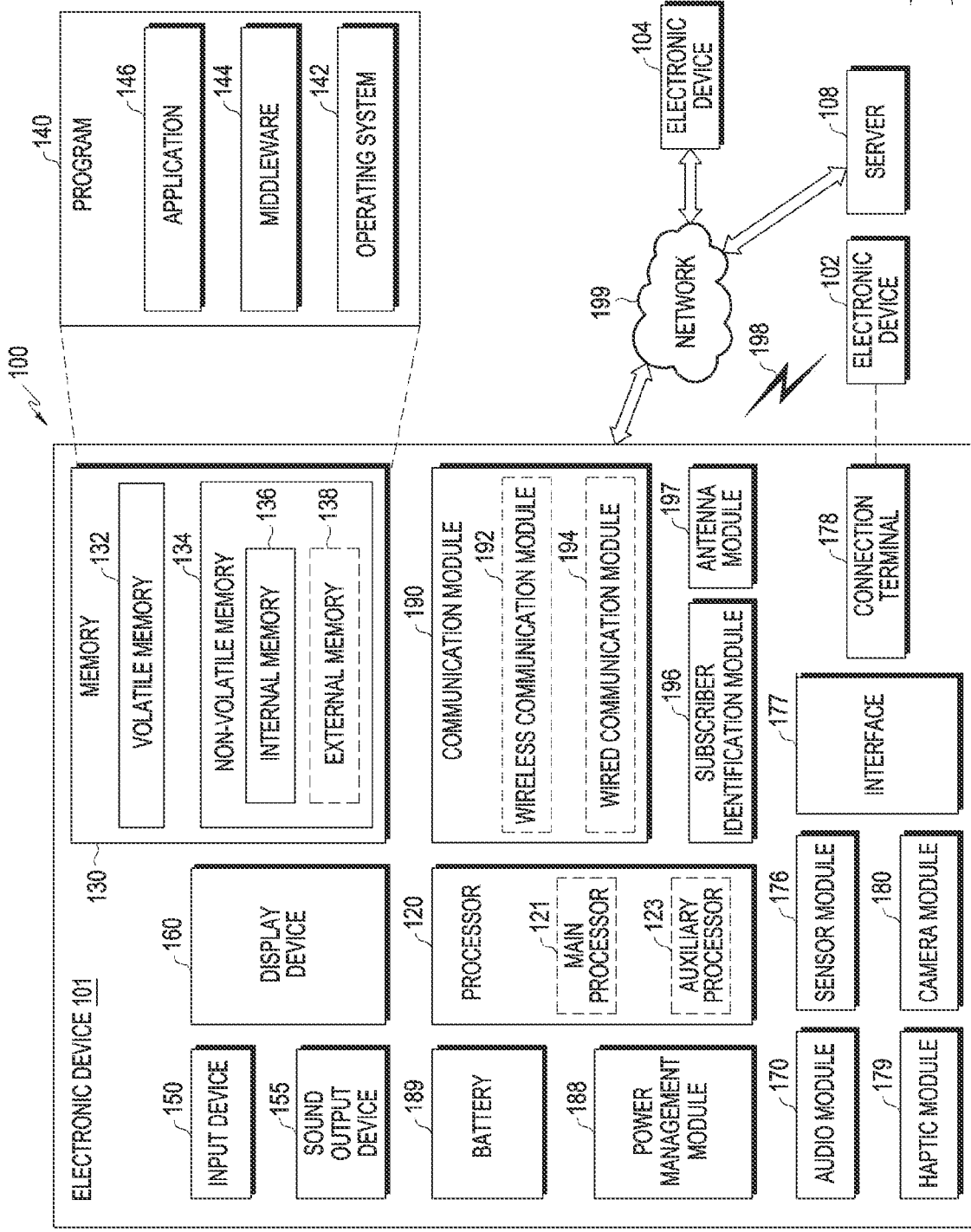
FIG. 1 is a diagram illustrating an electronic device to adjust the position of content displayed on a display based on ambient illuminance in a network environment, according to an embodiment.

FIG. 1 is a block diagram illustrating an electronic device 101 to adjust the position of content displayed on a display based on ambient illuminance in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
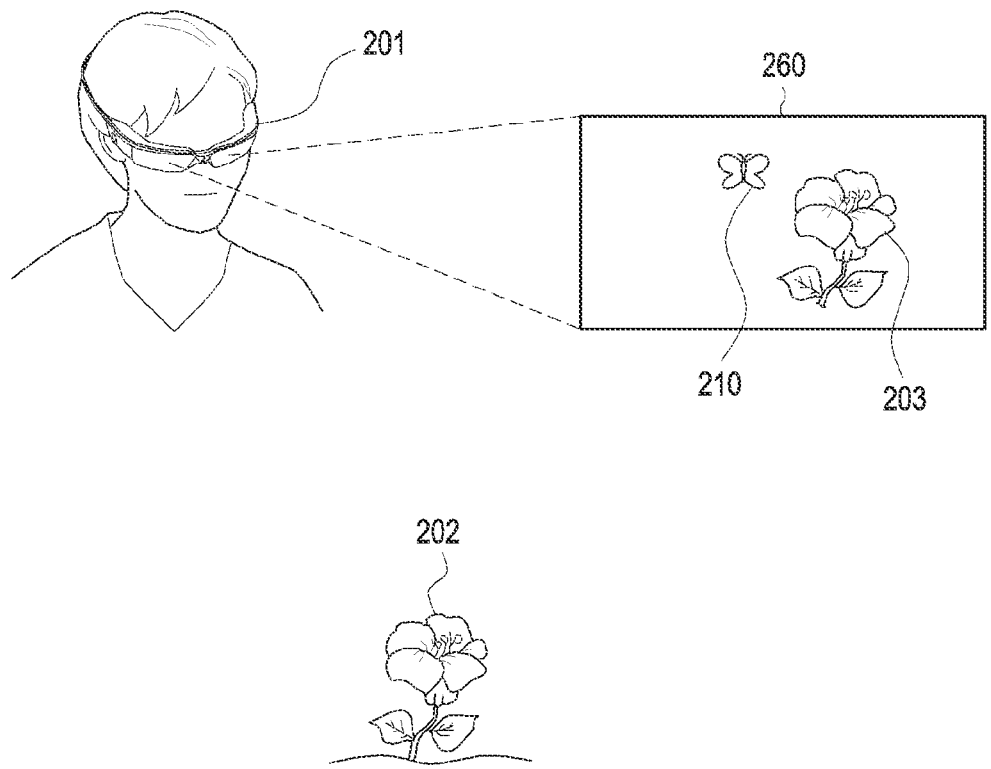
FIG. 2 is a diagram of an electronic device, according to an embodiment.

FIG. 2 is a diagram of an electronic device 201, according to an embodiment.

Referring to FIG. 2, an electronic device 201 may be implemented in substantially the same or a similar manner to the electronic device 101 described above in connection with FIG. 1. The electronic device 201 may include a wearable device (e.g., smart glasses). The electronic device 201 may include a display 260. The display 260 may include a transparent glass plate, a reflective, translucent glass, an optical wave guide-type glass, and/or a transparent display.

The electronic device 201 may display content 210 through the display 260 using augmented reality (AR) technology. The content 210 may contain images and/or objects stored in the electronic device 201. An external object 202 may be recognized by the user through the display 260 (e.g., a transparent display) included in the electronic device 201. The electronic device 202 may be recognized in a first position 203 of the display 260. The external object 202 along with the content 210 displayed on the display 260 may be recognized by the user.

The electronic device 201 may identify at least one of the ambient illuminance or speed of the electronic device 201 and adjust the position and/or size of content displayed through the display 260 based on at least one of the identified ambient illuminance or speed of the electronic device 201. The electronic device 201 may adjust the position and/or size of the content displayed through the display 260 to minimize a shift of the user's gaze due to a change in the ambient illuminance ambient illuminance speed.

Figure 3:
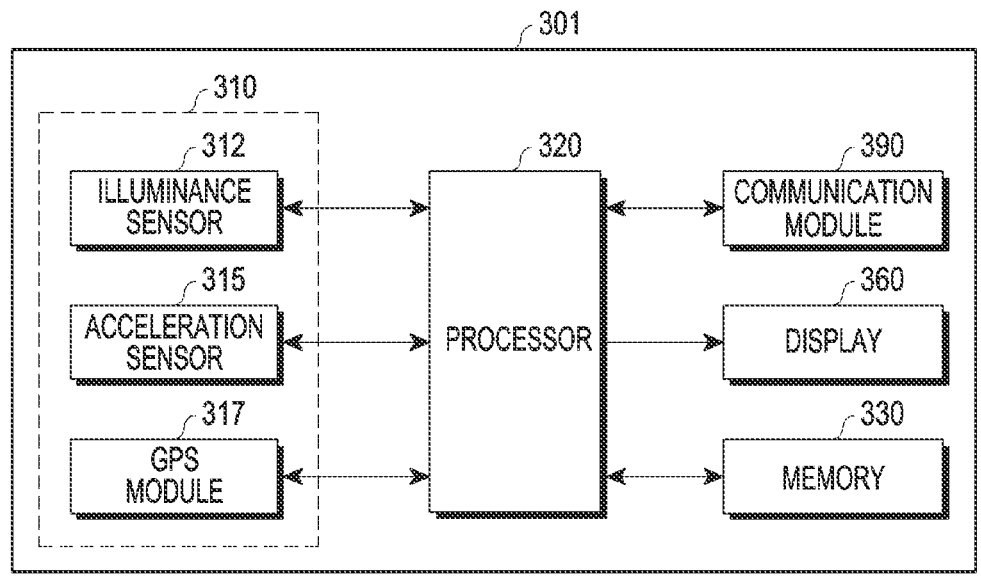
FIG. 3 is a diagram of a configuration of an electronic device, according to an embodiment.

FIG. 3 is a diagram of a configuration of an electronic device 301, according to an embodiment.

Referring to FIG. 3, the electronic device 301 may be implemented in substantially the same or a similar manner to the electronic device 101 or 102 of FIG. 1 or the electronic device 201 of FIG. 2. The electronic device 301 may include at least one of a sensor module 310, a processor 320, a memory 330, a display 360, or a communication module 390.

The sensor module 310 may detect the state of the electronic device 301. The sensor module 310 may be implemented in the same or a similar manner to the sensor module 176 described above in connection with FIG. 1. The sensor module 310 may detect the ambient illuminance and/or speed (or acceleration) of the electronic device 310. The sensor module 310 may include an illuminance sensor 312, an acceleration sensor 315, and a global positioning system (GPS) module 317.

The illuminance sensor 312 may detect the ambient illuminance of the electronic device 310. The illuminance sensor 312 may detect the ambient illuminance of the electronic device 310 and transmit a signal corresponding to the detected ambient illuminance to the processor 320. The processor 320 may identify the ambient illuminance of the electronic device 310 based on the signal received from the illuminance sensor 312.

The acceleration sensor 315 may detect the acceleration and/or speed of the electronic device 310. The acceleration sensor 315 may detect the acceleration and/or speed of the electronic device 310 and transmit a signal corresponding to the detected acceleration and/or speed to the processor 320. The processor 320 may identify the acceleration and/or speed of the electronic device 310 based on the signal received from the speed sensor 315.

The GPS module 317 may obtain information about the position of the electronic device 310. The processor 320 may determine a variation in the position of the electronic device 310 based on the position information received from the GPS module 317. The processor 320 may identify the speed of the electronic device 310 based on the change in the position of the electronic device 310.

The processor 320 may control the overall operation of the electronic device 301. The processor 320 may be implemented in substantially the same or a similar manner to the processor 120 of FIG. 1.

The processor 320 may display images (or content) stored in the memory 330 through the display 360. The processor 320 may display images (or content) using augmented reality technology. The processor 320 may adjust the position and/or size of the image (or content) displayed using augmented reality technology according to the ambient illuminance and/or speed of the electronic device 301 obtained using the sensor module 310.

The processor 320 may adjust the position of the output of content displayed on the display 360 according to the ambient illuminance of the electronic device 301. The processor 320 may adjust the position of the output of content to the left or right.

When the illuminance is higher than a designated illuminance, the user's field-of-view may be wide and, thus, the processor 320 may adjust the position of the output of content so that the content is output in the display region corresponding to the wide field-of-view. Further, the processor 320 may output the content with a shorter focal length than when the illuminance is lower. When the illuminance is lower than the designated illuminance, the user's field-of-view may be narrow and, thus, the processor 320 may adjust the position of the output of content so that the content is output in the display region corresponding to the narrow field-of-view. Further, the processor 320 may output the content with a longer focal length than when the illuminance is higher.

The processor 320 may identify the ambient illuminance of the electronic device 301 using the illuminance sensor 312. The processor 320 may display content in the display region corresponding to the range that includes the identified illuminance based on the identified illuminance. When the identified illuminance is within a first illuminance range, the processor 320 may designate the position of display of the content as at least part of a first display region. When the identified illuminance is within a second illuminance range, the processor 320 may designate the position of display of the content as at least part of a second display region. The first display region and the second display region may mean regions included in the display 360. The first display region and the second display region may mean regions when an image and/or object is displayed using augmented reality technology. The first display region and the second display region may have different view angles (or fields of view) and/or focal lengths. When the second illuminance range corresponds to an illuminance higher than the first illuminance range, the first display region may correspond to a first FOV, and the second display region may correspond to a second FOV wider than the first FOV.

The processor 320 may adjust the position of the output of content displayed on the display 360 according to the speed of the electronic device 301. The processor 320 may adjust the position of the output of content to the left or right.

When the speed is lower than a designated speed, the user's FOV may be wide and, thus, the processor 320 may adjust the position of the output of content so that the content is output in the display region corresponding to the wide FOV. Further, the processor 320 may output the content with a shorter focal length than when the speed is higher. When the speed is higher than the designated speed, the user's FOV may be narrow and, thus, the processor 320 may adjust the position of the output of content so that the content is output in the display region corresponding to the narrow FOV. Further, the processor 320 may output the content with a longer focal length than when the speed is lower.

The processor 320 may identify the speed of the electronic device 301 using at least one of the acceleration sensor 315 and the GPS module 317. The processor 320 may display content in the display region corresponding to the range that includes the identified speed based on the identified speed. When the identified speed is within a first speed range, the processor 320 may designate the position of display of the content as at least part of a third display region. When the identified speed is within a second speed range, the processor 320 may designate the position of display of the content as at least part of a fourth display region. The third display region and the fourth display region may mean regions included in the display 360. The third display region and the fourth display region may mean regions when an image and/or object is displayed using augmented reality technology. The third display region and the fourth display region may have different view angles (or FOVs) and/or focal lengths. When the second speed range corresponds to a speed higher than the first speed range, the third display region may correspond to a third FOV, and the fourth display region may correspond to a fourth FOV narrower than the third FOV and having a focal length longer than the third FOV. The first display region and the third display region may be the same as or different from each other. The second display region and the fourth display region may be the same as or different from each other.

The processor 320 may receive a request for displaying content. In response to an input requesting the display of content received through an input device 150, the processor 320 may identify the content display request.

Upon identifying the content display request, the processor 320 may identify a position where the content is to be displayed among a plurality of display regions included in the display 360. The processor 320 may identify the position of display of the content in the first display region or the second display region.

The processor 320 may display the content through the display 360 based on the identified position. The processor 320 may display the content in the first display region or second display region using augmented reality technology.

The processor 320 may adjust the virtual image corresponding to the content based on at least one of the illuminance and speed of the electronic device 310 identified through the sensor module 310. The processor 320 may adjust the view angle (or FOV) and/or focal length of the displayed content using augmented reality technology. The processor 320 may adjust the position of the virtual image corresponding to the content to the inside or outside. The processor 320 may adjust at least one of the position and size of the content displayed on the display 360 so that the position of the virtual image corresponding to the content is adjusted. The processor 320 may adjust the position of the virtual image corresponding to the content by adjusting the distance between an image for the left eye corresponding to the content and an image for the right eye corresponding to the content.

The processor 320 may include a sensor hub. The sensor hub may control the operation of the sensor module 310. The sensor hub may receive signals output from the sensor module 310. For example, the sensor hub may be driven at low power.

The electronic device 301 may further include a sensor hub (not shown) as a separate component from the processor 320. The sensor hub may receive signals output from the sensor module 310 and transmit the received signals to the processor 320. The sensor hub may be driven at lower power compared to the processor 320. The sensor hub may control the sensor module 310 even though the processor 320 is in sleep mode. The sensor hub may receive signals output from the sensor module 310 even though the processor 320 is in sleep mode.

The memory 330 may store data about the electronic device 301. The memory 330 may store the content of the electronic device 301. The memory 330 may be implemented in substantially the same or a similar manner to the memory 130 described above in connection with FIG. 1.

The display 360 may display content stored in the memory 330. The display 360 may display content along with an external object using augmented reality technology. The display 360 may include a liquid crystal display or projector to emit light. The display 360 may include a device to change the path of light emitted from a light emitter, such as a reflective glass, an optical wave guide, and/or a transmissive glass.

The display 360 may include a plurality of display regions each of which corresponds to a respective one of a plurality of FOVs. The plurality of display regions may have various view angles or FOVs and/or focal lengths.

The display 360 may include a transparent glass plate. The display 360 may include a virtual display region capable of displaying images (or content) through a glass plate. The display 360 may include a display region capable of displaying images or content on a glass plate. The display 360 may include a monocular or binocular glass.

The communication module 390 may transmit or receive data to/from an external electronic device.

The communication module 390 may receive information indicating the state of the electronic device 301 which is detected from the external electronic device. The communication module 390 may receive information about the ambient illuminance and/or speed of the electronic device 301 detected from the external electronic device. The communication module 390 may transmit the information about the ambient illuminance and/or speed of the electronic device 301 received from the external electronic device to the processor 320.

The electronic device 301 may further include a camera 180. The processor 320 may display images captured through the camera 180 on the display 360 while displaying images or content stored in the memory 330 using augmented reality technology. The processor 320 may adjust the position and/or size of the image or content displayed through augmented reality technology based on the illuminance and speed of the electronic device 301. The processor 320 may adjust the view angle or FOV and/or focal length of the displayed content using augmented reality technology.

Figure 4:
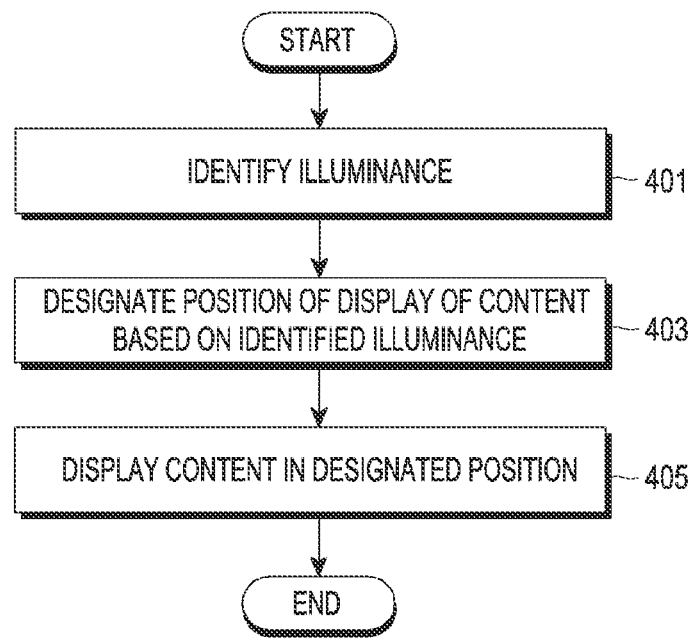
FIG. 4 is a flowchart of operations of an electronic device, according to an embodiment.

FIG. 4 is a flowchart of operations of the electronic device 301, according to an embodiment.

Referring to FIG. 4, at step 401, the processor 320 may identify the ambient illuminance of the electronic device 301. The processor 320 may identify the ambient illuminance of the electronic device 301 through the illuminance sensor 312.

At step 403, the processor 320 may designate a position where content stored in the memory 330 is to be displayed based on the identified illuminance. The processor 320 may designate any one of display regions having different view angles or FOVs and/or focal lengths included in the display as the position where the content is to be displayed.

At step 405, the processor 320 may display the content in the designated position through the display 360.

Figure 5:
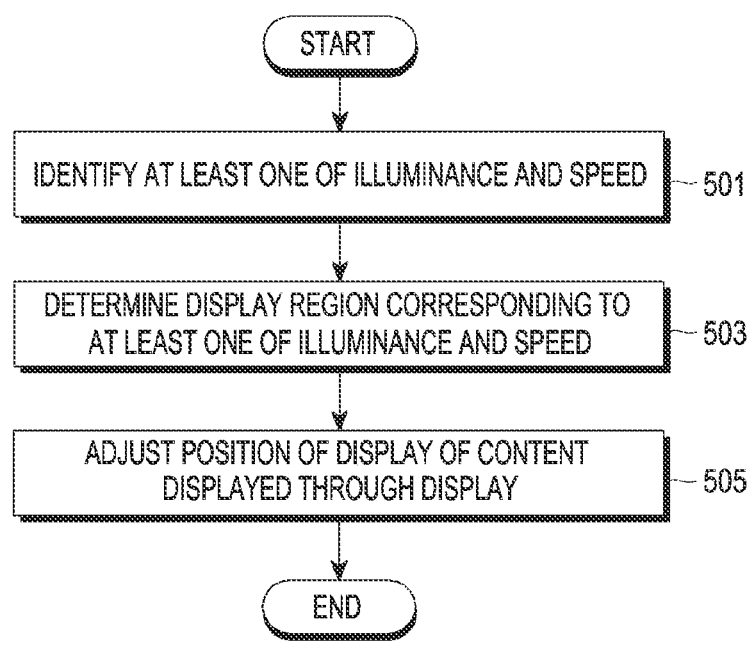
FIG. 5 is a flowchart of operations of an electronic device, according to an embodiment.

FIG. 5 is a flowchart of operations of the electronic device 301, according to an embodiment.

Referring to FIG. 5, at step 501, the processor 320 may identify the state of the electronic device 301 through the sensor module 310. The processor 320 may identify at least one of the ambient illuminance and speed of the electronic device 301 through the sensor module 310.

At step 503, the processor 320 may determine the display region corresponding to at least one of the identified ambient illuminance and speed of the electronic device 301. The processor 320 may determine the display region corresponding to at least one of the identified illuminance and speed of the electronic device 301 among the display regions having different view angles or FOVs and/or focal lengths and included in the display.

At step 505, the processor 320 may adjust the position of display of the content displayed through the display 360. The processor 320 may change the position of display of content to the display region corresponding to at least one of the ambient illuminance and speed of the electronic device 301. The processor 320 may change the position of display of the virtual image corresponding to the content to the display region corresponding to at least one of the ambient illuminance and speed of the electronic device 301. In order to change the position of display of the virtual image corresponding to the content, the processor 320 may adjust the position and/or size of the content displayed through the display 360.

Figure 6:
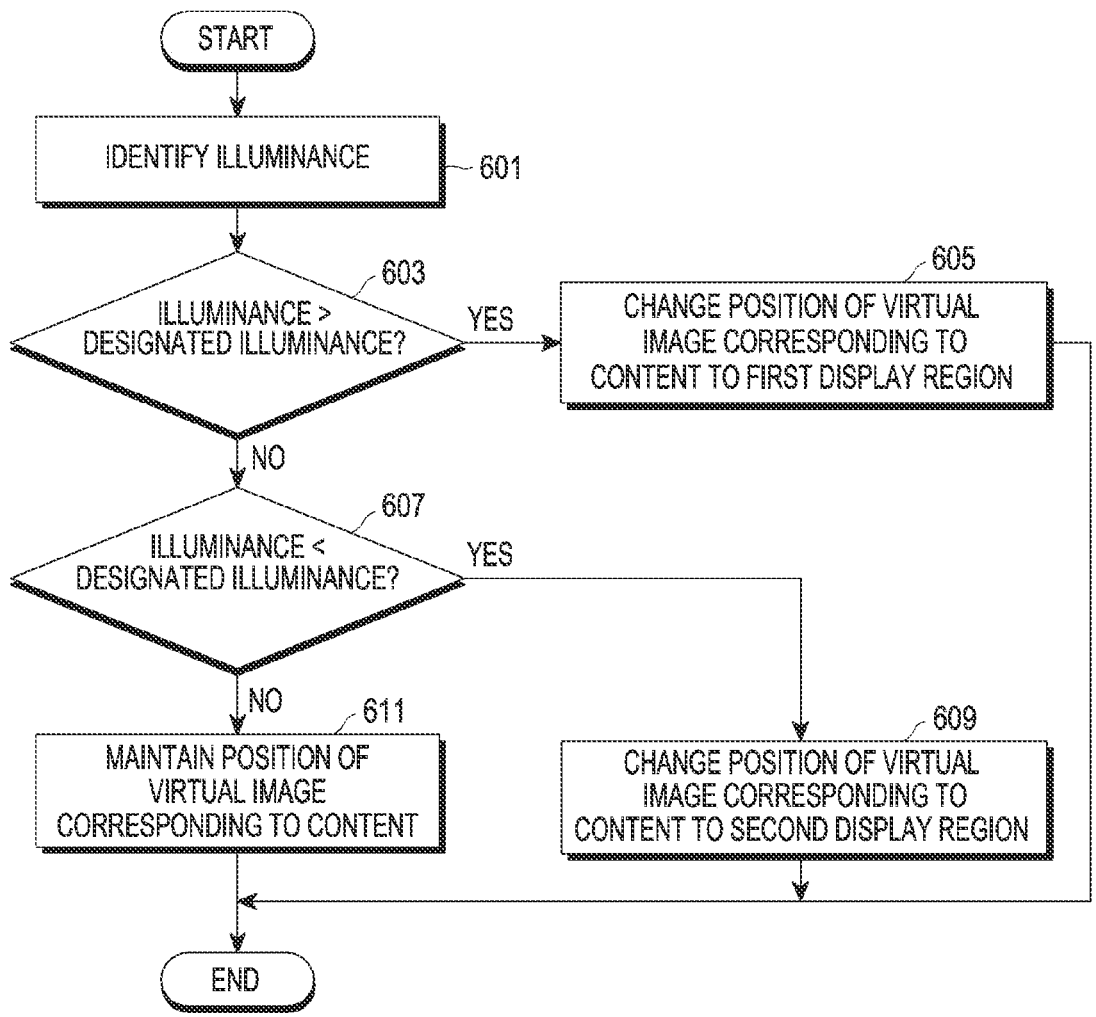
FIG. 6 is a flowchart of operations of an electronic device, according to an embodiment.

FIG. 6 is a flowchart of operations of the electronic device 301, according to an embodiment.

Referring to FIG. 6, at step 601, the processor 320 may identify the ambient illuminance of the electronic device 301 using the illuminance sensor 312.

At step 603, the processor 320 may compare the identified illuminance with a designated illuminance. The processor 320 may determine whether the identified illuminance is higher than the designated illuminance. The designated illuminance may be set by the user or automatically by the processor 320.

At step 605, when the identified illuminance is higher than the designated illuminance, the processor 320 may change the position of the virtual image corresponding to the content to a first display region having a broader view angle or FOV. The processor 320 may change the position of the virtual image corresponding to the content to the outside of the user (e.g., away from the center axis of the user's FOV). In order to change the position of the virtual image corresponding to the content, the processor 320 may adjust the position and/or size of the content displayed on the display 360. The processor 320 may change the position of content displayed through the display 360 to an outside region. The processor 320 may increase the distance between the image for the left eye corresponding to the content and the image for the right eye corresponding to the content. The processor 320 may display content with a shorter focal length than when the illuminance is lower.

When the identified illuminance is higher than the designated illuminance, the processor 320 may output the image not in a first region but in a second region that has been further expanded compared to the first region.

At step 607, if the identified illuminance is not higher than the designated illuminance, the processor 320 may determine whether the identified illuminance is lower than the designated illuminance.

At step 609, when the identified illuminance is lower than the designated illuminance, the processor 320 may change the position of the virtual image corresponding to the content to a second display region having a narrower view angle or FOV. The processor 320 may change the position of the virtual image corresponding to the content to the inside of the user (e.g., closer to the center axis of the user's FOV). In order to change the position of the virtual image corresponding to the content, the processor 320 may adjust the position and/or size of the content displayed on the display 360. The processor 320 may change the position of content displayed through the display 360 to an inside region. The processor 320 may decrease the distance between the image for the left eye corresponding to the content and the image for the right eye corresponding to the content.

When the identified illuminance is lower than the designated illuminance, the processor 320 may output the image in a third region that has been restricted compared to the first region.

At step 611, when the identified illuminance is the same as the designated illuminance, the processor 320 may maintain the position of the virtual image corresponding to the content. In other words, the processor 320 may abstain from changing the position and/or size of the content displayed through the display 360.

Figure 7:
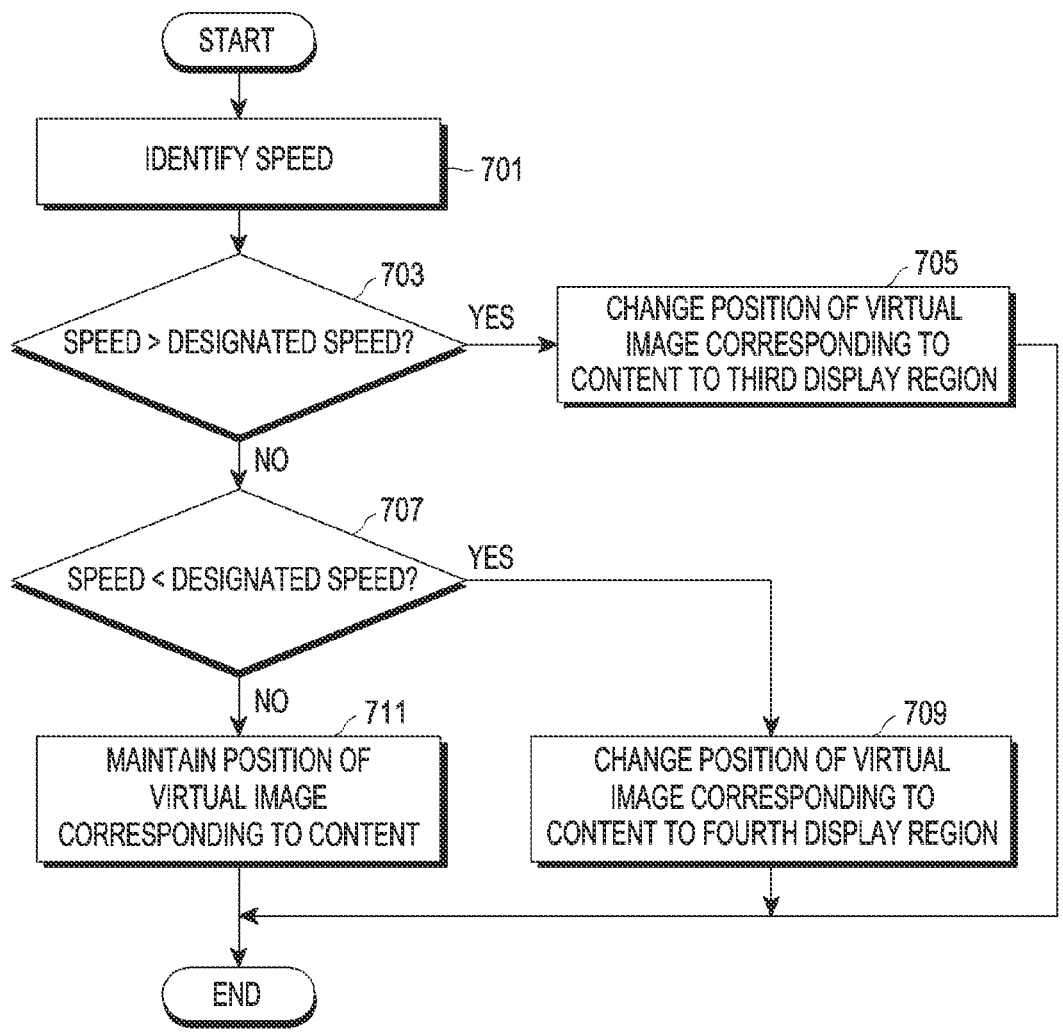
FIG. 7 is a flowchart of operations of an electronic device, according to an embodiment.

FIG. 7 is a flowchart of operations of the electronic device 301, according to an embodiment.

Referring to FIG. 7, at step 701, the processor 320 may identify the speed of the electronic device 301 using at least one of the acceleration sensor 315 and the GPS module 317.

At step 703, the processor 320 may compare the identified speed with a designated speed. The processor 320 may determine whether the identified speed is higher than the designated speed. The designated speed may be set by the user or automatically by the processor 320.

At step 705, when the identified speed is higher than the designated speed, the processor 320 may change the position of the virtual image corresponding to the content to a third display region having a narrower view angle or FOV. The processor 320 may change the position of the virtual image corresponding to the content to the inside of the user (e.g., closer to the center axis of the user's FOV). In order to change the position of the virtual image corresponding to the content, the processor 320 may adjust the position and/or size of the content displayed on the display 360. The processor 320 may change the position of content displayed through the display 360 to an inside region. The processor 320 may decrease the distance between the image for the left eye corresponding to the content and the image for the right eye corresponding to the content. Thus, the processor 320 may display content with a longer focal length than when the speed is lower.

At step 707, if the identified speed is not higher than the designated speed, the processor 320 may determine whether the identified speed is lower than the designated speed.

At step 709, when the identified speed is lower than the designated speed, the processor 320 may change the position of the virtual image corresponding to the content to a fourth display region having a broader view angle or FOV. The processor 320 may change the position of the virtual image corresponding to the content to the outside of the user (e.g., away from the center axis of the user's FOV). In order to change the position of the virtual image corresponding to the content, the processor 320 may adjust the position and/or size of the content displayed on the display 360. The processor 320 may change the position of content displayed through the display 360 to an outside region. The processor 320 may increase the distance between the image for the left eye corresponding to the content and the image for the right eye corresponding to the content. Thus, the processor 320 may display content with a shorter focal length than when the speed is higher.

At step 711, when the identified speed is the same as the designated speed, the processor 320 may maintain the position of the virtual image corresponding to the content. In other words, the processor 320 may abstain from changing the position and/or size of the content displayed through the display 360.

Figure 8A:
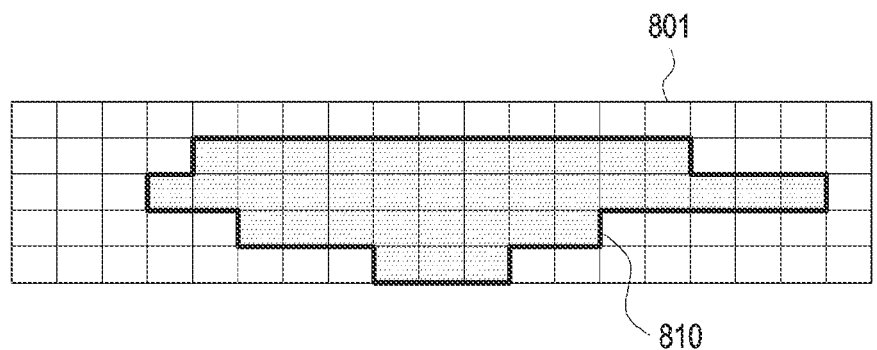
FIGS. 8A and 8B are diagrams of differences between view angle and visibility depending on illuminance, according to an embodiment.
Figure 8B:
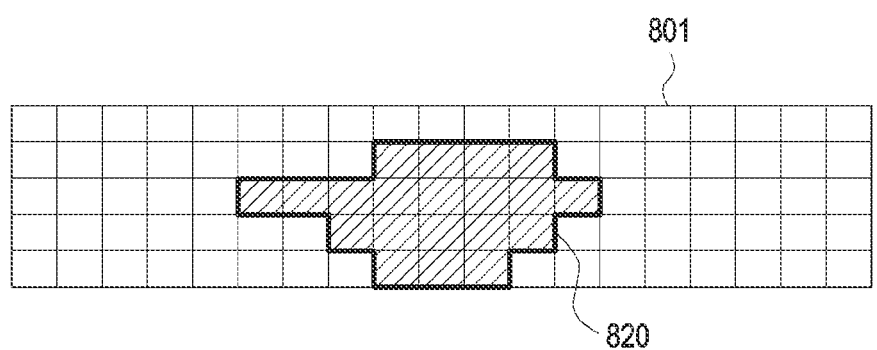

FIGS. 8A and 8B are diagrams of differences between view angle and visibility depending on illuminance, according to an embodiment.

Referring to FIGS. 8A and 8B, the processor 320 may determine a visible region corresponding to the illuminance identified through the illuminance sensor 312 and designate a display region based on the determined visible region.

FIG. 8A illustrates a visible region when a human retina perceives an image at higher illuminance (e.g., in the daytime). At higher illuminance, the human retina may perceive the image within a first visible region 810 of an entire region 801. In other words, the human retina may recognize an object within the view angle or FOV and/or visible distance corresponding to the first visible region 810.

The processor 320 may display content in the first visible region 810 based on the ambient illuminance of the electronic device 301. The processor 320 may change the position of the content displayed through the display 360 to the first visible region 810.

FIG. 8B illustrates a visible region when a human retina perceives an image at lower illuminance (e.g., in the nighttime). At lower illuminance, the human retina may perceive the image within a second visible region 820 of the entire region 801. In other words, the human retina may recognize an object within the view angle or FOV and/or visible distance corresponding to the second visible region 820. The second visible region 820 may have a narrower view angle and shorter visible distance than the first visible region 810.

The processor 320 may display content in the second visible region 820 based on the ambient illuminance of the electronic device 301. The processor 320 may change the position of the content displayed through the display 360 to the second visible region 820.

The human retina may recognize an object within a wider view angle and longer visible distance as the illuminance increases. Accordingly, the processor 320 may identify the ambient illuminance and/or a variation in illuminance of the electronic device 301 and display content in the visible region based on the identified illuminance and variation in illuminance.

Figure 9:
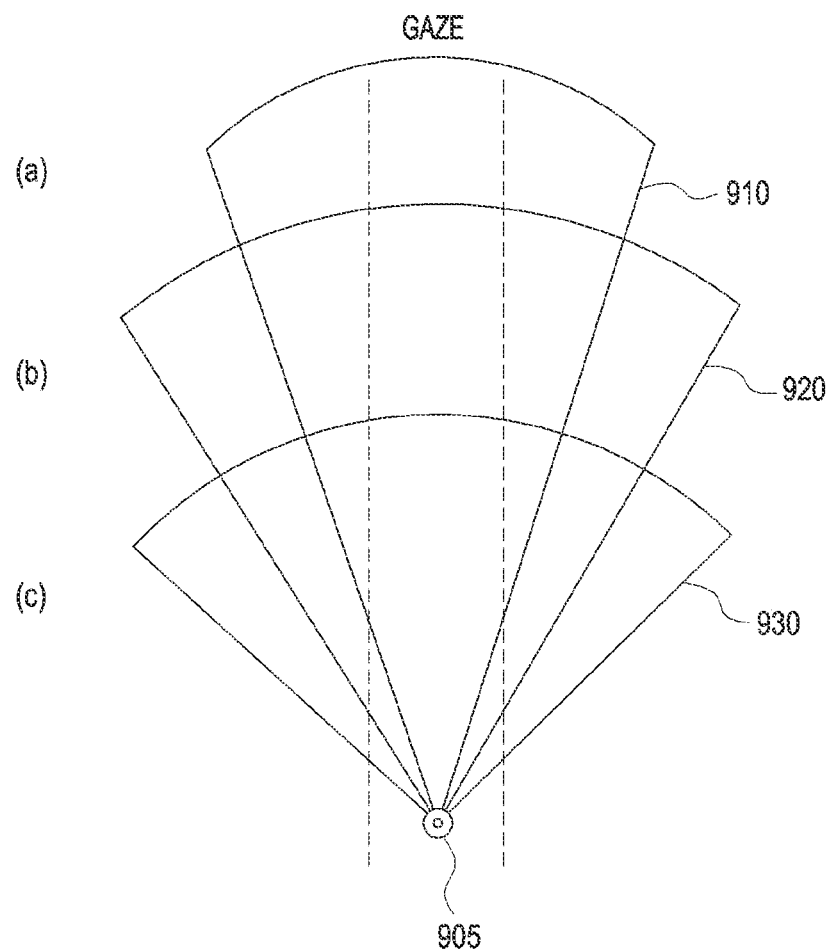
FIG. 9 is a diagram of differences between view angle and visibility depending on speeds, according to an embodiment.

FIG. 9 is a diagram of differences between view angle and visibility depending on speeds, according to an embodiment.

Referring to FIG. 9, the processor 320 may determine a visible region corresponding to the speed identified through the acceleration sensor 315 and the GPS module 317 and designate a display region based on the determined visible region.

FIG. 9 illustrates a visible region when the retina of the user 905 perceives an image at a first speed (e.g., at a higher speed). At the first speed, the human retina may perceive the image within the first visible region 910. In other words, the human retina may recognize an object within the view angle or FOV and/or focal length corresponding to the first visible region 910.

The processor 320 may display content in the first visible region 910 based on the speed of the electronic device 301. The processor 320 may change the position of the content displayed through the display 360 to the first visible region 910.

At a second speed (e.g., at a normal speed), the human retina may perceive the image within the second visible region 920. In other words, the human retina may recognize an object within the view angle or FOV and/or focal length corresponding to the second visible region 920. The second visible region 920 may mean a region having a broader view angle or FOV and/or shorter focal length than the first visible region 910.

The processor 320 may display content in the second visible region 920 based on the speed of the electronic device 301. The processor 320 may change the position of the content displayed through the display 360 to the second visible region 920.

At a third speed (e.g., at a lower speed), the human retina may perceive the image within the third visible region 930. In other words, the human retina may recognize an object within the view angle or FOV and/or focal length corresponding to the third visible region 930. The third visible region 930 may have a region having a broader view angle or FOV and/or shorter focal length than the second visible region 920.

The processor 320 may display content in the third visible region 930 based on the speed of the electronic device 301. The processor 320 may change the position of the content displayed through the display 360 to the third visible region 930.

Referring to FIG. 9, the human retina may recognize an object within a narrower view angle or FOV and shorter visible distance as the speed increases. Accordingly, the processor 320 may identify the speed and/or a variation in speed of the electronic device 301 and display content in the visible region based on the identified speed and variation in speed.

Figure 10A:
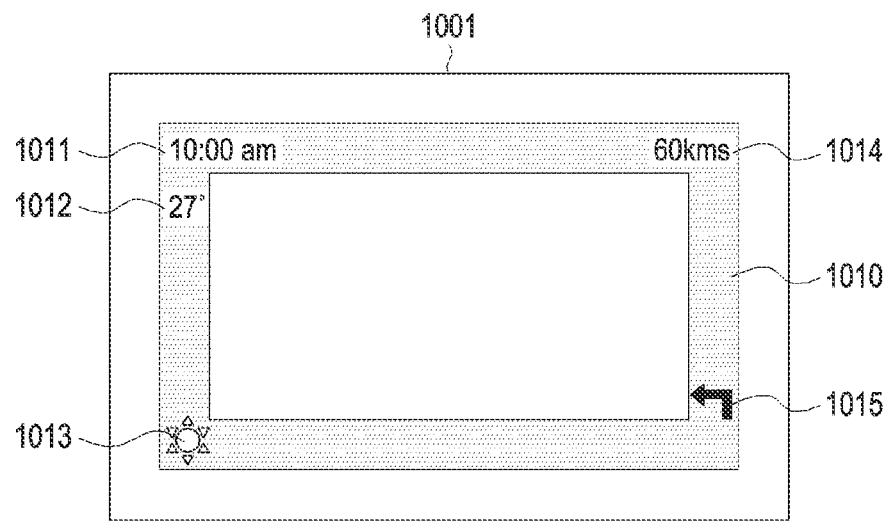
FIGS. 10A, 10B, and 10C are diagrams of the operation of adjusting the position of content on an electronic device, according to an embodiment.
Figure 10B:
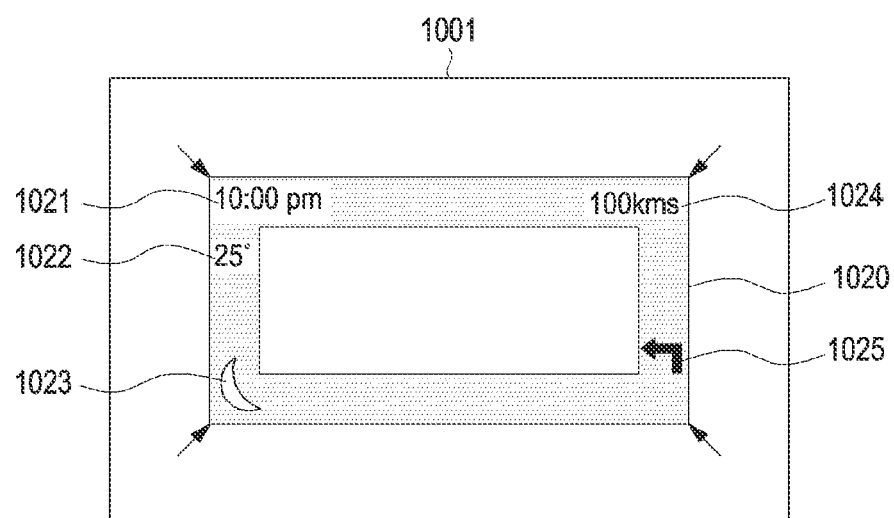
Figure 10C:
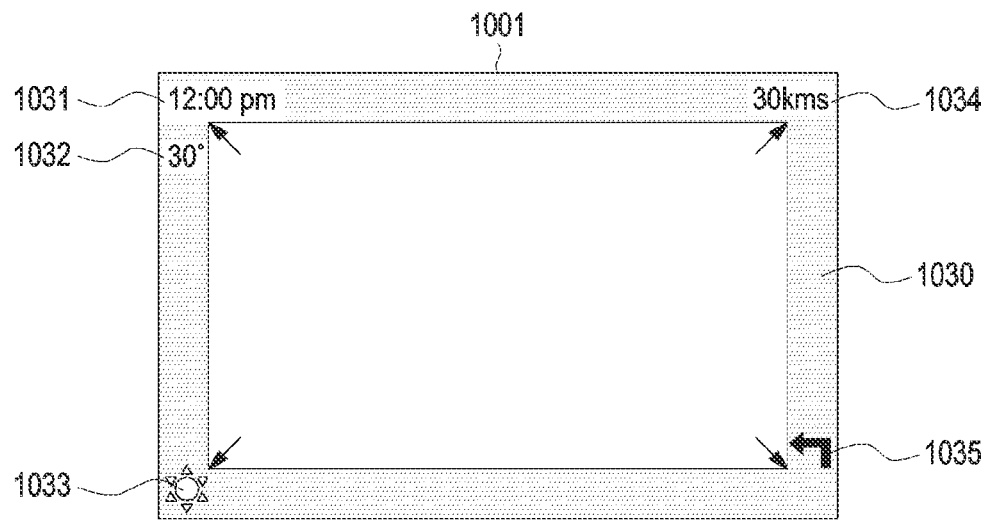

FIGS. 10A, 10B, and 10C are diagrams of the operation of adjusting the position of content on an electronic device, according to an embodiment.

Referring to FIGS. 10A to 10C, the processor 320 may adjust the position of content displayed through a display 1001 as per the illuminance and speed of the electronic device 301. The display 1001 may include a monocular display or a single display.

Referring to FIG. 10A, the processor 320 may display a plurality of contents 1011 to 1015 in a first display region 1010 based on at least one of the identified illuminance and speed.

When the identified illuminance is within a first illuminance range, the processor 320 may display the plurality of contents 1011 to 1015 in the first display region 1010. The first display region 1010 may correspond to the visible region 810 of FIG. 8A.

When the identified speed is within a first speed range (e.g., 60 km/h), the processor 320 may display the plurality of contents 1011 to 1015 in the first display region 1010. When the identified illuminance is within the first illuminance range and the identified speed is within the first speed range (e.g., 60 km/h), the processor 320 may display the plurality of contents 1011 to 1015 in the first display region 1010.

Referring to FIG. 10B, the processor 320 may display a plurality of contents 1021 to 1025 in a second display region 1020 based on at least one of the identified illuminance and speed.

When the identified illuminance is within a second illuminance range, the processor 320 may display the plurality of contents 1021 to 1025 in the second display region 1020 having a narrower view angle and shorter visible distance (or focal length) than the first display region 1010. The second illuminance range may correspond to an illuminance lower than that of the first illuminance range. The second display region 1020 may correspond to the visible region 820 of FIG. 8B.

When the identified speed is within a second speed range (e.g., 100 km/h), the processor 320 may display the plurality of contents 1021 to 1025 in the second display region 1020. When the identified illuminance is within the second illuminance range and the identified speed is within the second speed range (e.g., 100 km/h), the processor 320 may display the plurality of contents 1021 to 1025 in the second display region 1020.

The processor 320 may identify a variation in ambient illuminance (or speed) of the electronic device 301. The processor 320 may display the plurality of contents 1011 to 1015 which used to be displayed in the first display region 1010 the second display region 1020 as per the variation in illuminance (or speed). The processor 320 may gradually change the position of display of the plurality of contents 1011 to 1015 from the first display region 1010 to the second display region 1020 as per the variation in illuminance (or speed).

The processor 320 may adjust the size of the plurality of contents 1021 to 1025 displayed on the second display region 1020. As the position of display of the plurality of contents 1011 to 1015 varies, the processor 320 may display the contents 1021 to 1025 which are equal or smaller in size than the contents 1011 to 1015 used to be displayed in the first display region 1010 in the second display region 1020.

Referring to FIG. 10C, the processor 320 may display a plurality of contents 1031 to 1035 in a third display region 1030 based on at least one of the identified illuminance and speed.

When the identified illuminance is within a third illuminance range, the processor 320 may display the plurality of contents 1031 to 1035 in the third display region 1030 having a broader view angle and longer visible distance (or focal length) than the first display region 1010. The third illuminance range may correspond to an illuminance higher than that of the first illuminance range.

When the identified speed is within a third speed range (e.g., 30 km/h), the processor 320 may display the plurality of contents 1031 to 1035 in the third display region 1030. When the identified illuminance is within the third illuminance range and the identified speed is within the third speed range (e.g., 30 km/h), the processor 320 may display the plurality of contents 1031 to 1035 in the third display region 1030.

The processor 320 may adjust the size of the plurality of contents 1031 to 1035 displayed on the third display region 1030. As the position of display of the plurality of contents 1011 to 1015 varies, the processor 320 may display the contents 1031 to 1035 which are equal or larger in size than the contents 1011 to 1015 used to be displayed in the first display region 1010 in the third display region 1030.

The first display region 1010, the second display region 1020, and the third display region 1030 may overlap one another. Alternatively, the first display region 1010, the second display region 1020, and the third display region 1030 may not overlap one another.

Figure 11:
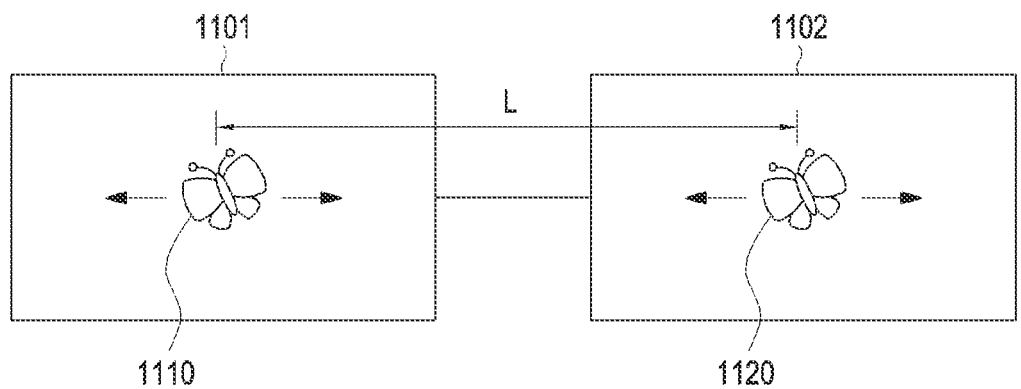
FIG. 11 is a diagram of the operation of adjusting the position of content on an electronic device, according to an embodiment.

FIG. 11 is a diagram of the operation of adjusting the position of content on an electronic device, according to an embodiment.

Referring to FIG. 11, the processor 320 may adjust the position of content displayed through the display 360 as per the illuminance and speed of the electronic device 301. The display 360 may include a binocular display or a plurality of displays 1101 and 1102.

The processor 320 may display content on each of the plurality of displays 1101 and 1102, implementing augmented reality technology. The processor 320 may display a first image 1110 (an image for the left eye) corresponding to the content on the first display 1101 and a second image 1120 (an image for the right eye) corresponding to the content on the second display 1102.

The processor 320 may adjust the distance L between the first image 1110 (e.g., an image for the left eye) and the second image 1120 (e.g., an image for the right eye) corresponding to the content displayed through the display 360 based on at least one of the illuminance and speed of the electronic device 301. The processor 320 may adjust the position (or depth) of the virtual image corresponding to the content by adjusting the distance L between the first image 1110 and the second image 1120. The processor 320 may move the first image 1110 to the left and the second image 1120 to the right, thus increasing the distance L between the first image 1110 and the second image 1120. The processor 320 may move the first image 1110 to the right and the second image 1120 to the left, thus reducing the distance between the first image 1110 and the second image 1120. The processor 320 may adjust the position or depth of the virtual image corresponding to the content by adjusting the distance between the first image 1110 and the second image 1120. In other words, the processor 320 may adjust the position or depth of the virtual image using binocular parallax for the first image 1110 and the second image 1120.

Figure 12A:
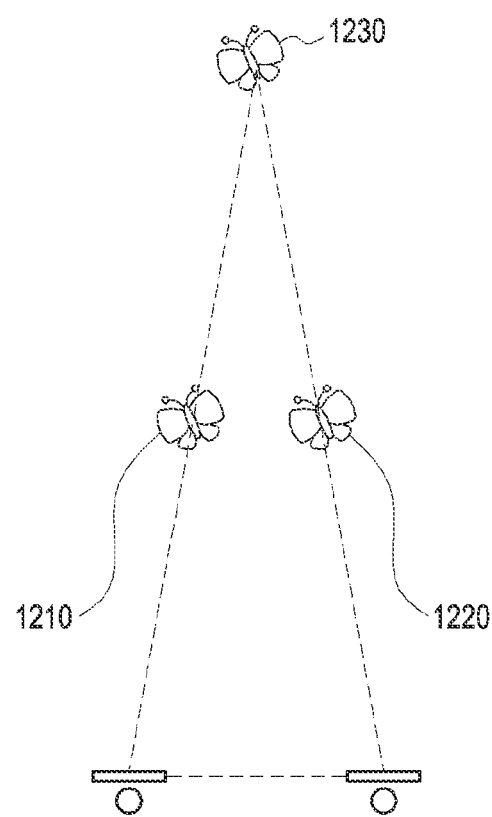
FIGS. 12A, 12B, and 12C are diagrams of the operation of adjusting the position of content on an electronic device, according to an embodiment.
Figure 12B:
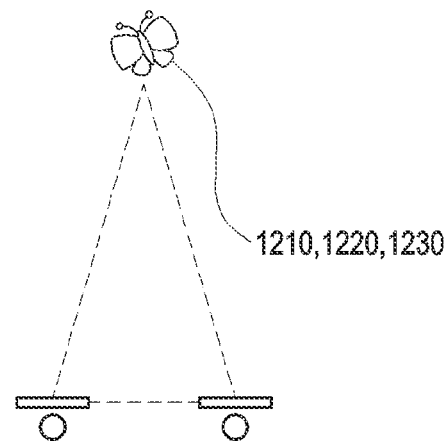
Figure 12C:
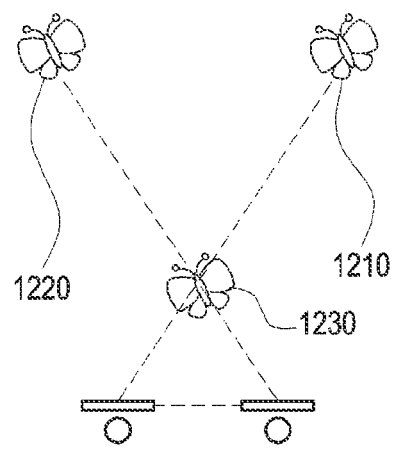

FIGS. 12A, 12B, and 12C are diagrams of the operation of adjusting the position of content on an electronic device, according to an embodiment.

Referring to FIGS. 12A to 12C, the processor 320 may adjust the distance between a first image 1210 and a second image 1220 corresponding to the content displayed through the display 360 (e.g., a binocular display) as per at least one of the illuminance and speed of the electronic device 301, adjusting the position of the virtual image 1230 corresponding to the content.

Referring to FIG. 12A, the processor 320 may adjust the position of the virtual image 1230 corresponding to the content displayed through the display 360.

The processor 320 may display the virtual image 1230 corresponding to the content in the first display region based on at least one of the identified illuminance or speed. Upon identifying a lower illuminance and/or a higher speed, the processor 320 may position the virtual image 1230 corresponding to the content in the first display region.

The processor 320 may display the first image 1210 on the left side of the center of the display 360 and the second image 1220 on the right side of the center of the display, positioning the virtual image 1230 in the first display region. The first display region may mean a region having a narrower view angle and a longer focal length. The first display region may mean an outside region of the display 360. For example, the first display region may correspond to the visible region 910 of FIG. 9.

Referring to FIG. 12B, the processor 320 may display the virtual image 1230 corresponding to the content in the second display region based on at least one of the identified illuminance or speed. Upon identifying a normal illuminance and/or a normal speed, the processor 320 may position the virtual image 1230 corresponding to the content in the second display region.

The processor 320 may display the first image 1210 in a middle portion of the display 360 and the second image 1220 in the middle portion of the display, positioning the virtual image 1230 in the second display region. The second display region may mean a region having a broader view angle and a shorter focal length than the first display region. The second display region may mean a region matching the display 360. The second display region may correspond to the visible region 920 of FIG. 9.

Referring to FIG. 12C, the processor 320 may display the virtual image 1230 corresponding to the content in the third display region based on at least one of the identified illuminance or speed. Upon identifying a higher illuminance and/or a lower speed, the processor 320 may position the virtual image 1230 corresponding to the content in the third display region.

The processor 320 may display the first image 1210 on the right side of the center of the display 360 and the second image 1220 on the left side of the center of the display, positioning the virtual image 1230 in the third display region. The third display region may mean a region having a broader view angle and a shorter focal length than the second display region. The third display region may mean an inside region of the display 360. The third display region may correspond to the visible region 930 of FIG. 9.

The processor 320 may adjust the position of the virtual image corresponding to the content to allow the content to be displayed in the display region corresponding to at least one of the illuminance and speed of the electronic device 301.

When the identified illuminance is higher than a range corresponding to a designated illuminance, the processor 320 may display the virtual image corresponding to the content which used to be displayed in the first display region in the second display region or the third display region. When the identified illuminance is lower than the range corresponding to the designated illuminance, the processor 320 may display the virtual image corresponding to the content which used to be displayed in the third display region in the first display region or the second display region. When the identified illuminance belongs to the range corresponding to the designated illuminance, the processor 320 may maintain the position of the virtual image corresponding to the content.

When the identified speed is lower than a range corresponding to a designated speed, the processor 320 may display the virtual image corresponding to the content which used to be displayed in the first display region in the second display region or the third display region. When the identified speed is higher than the range corresponding to the designated speed, the processor 320 may display the virtual image corresponding to the content which used to be displayed in the third display region in the first display region or the second display region. When the identified speed belongs to the range corresponding to the designated speed, the processor 320 may maintain the position of the virtual image corresponding to the content.

The processor 320 may identify a variation in illuminance (or speed) of the electronic device 301. The processor 320 may move the virtual image corresponding to the content displayed in the first display region to the second display region or the third display region as per the variation in illuminance (or speed). The processor 320 may gradually move the position of the virtual image corresponding to the content from the first display region to the second display region or the third display region as per the variation in illuminance (or speed).

According to an embodiment, an electronic device may include a first sensor, a memory, a display, and a processor configured to identify an ambient illuminance of the electronic device using the first sensor, when the identified illuminance is within a first illuminance range, designate a position where content stored in the memory is to be displayed in at least part of a first display region corresponding to a first field-of-view (FOV), and when the identified illuminance is within a second illuminance range, designate the position where the content is to be displayed in at least part of a second display region corresponding to a second FOV broader than the first FOV.

The processor may be configured to identify a request to display the content, upon identifying the content display request, identify the position of display of the content through the display, and display the content in the first display region or the second display region based on the identified position.

The second illuminance range may include a range corresponding to an illuminance higher than the first illuminance range.

The processor may be configured to adjust at least one of a position or size of the content to allow a position of a virtual image corresponding to the content to be adjusted based on the identified illuminance.

The processor may be configured to adjust the position of the virtual image corresponding to the content by adjusting a distance between an image for the left eye corresponding to the content and an image for the right eye corresponding to the content based on the identified illuminance.

The processor may be configured to, when the identified illuminance is lower than a designated illuminance, adjust the position of the virtual image to allow the content to be displayed in the first display region, and when the identified illuminance is higher than the designated illuminance, adjust the position of the virtual image to allow the content to be displayed in the second display region.

The processor may be configured to maintain the position of the virtual image corresponding to the content when the identified illuminance falls within a range corresponding to the designated illuminance.

The electronic device may further comprise a second sensor, wherein the processor may be configured to identify a speed of the electronic device using the second sensor, when the identified speed is within a first speed range, designate the position where the content stored in the memory is to be displayed in at least part of a third display region, and when the identified illuminance is within a second speed range, designate the position where the content is to be displayed in at least part of a fourth display region having a narrower FOV than the third display region.

The second speed range may correspond to a speed higher than the first speed range.

According to an embodiment, an electronic device may include a sensor configured to detect a state of the electronic device, a memory, a display, and a processor configured to identify the state of the electronic device using the sensor, when a sensor value indicating the identified state of the electronic device is within a first range, designate a position where content stored in the memory is to be displayed in at least part of a first display region corresponding to a first field-of-view (FOV), and when the sensor value is within a second range, designate the position where the content is to be displayed in at least part of a second display region corresponding to a second FOV broader than the first FOV.

The state of the electronic device may include at least one of an ambient illuminance of the electronic device or a speed of the electronic device.

The processor may be configured to adjust at least one of a position or size of the content to allow a position of a virtual image corresponding to the content to be adjusted based on the ambient illuminance of the electronic device.

The processor may be configured to adjust the position of the virtual image corresponding to the content by adjusting a distance between an image for the left eye corresponding to the content and an image for the right eye corresponding to the content based on the ambient illuminance of the electronic device.

The processor may be configured to adjust at least one of a position or size of the content to allow a position of a virtual image corresponding to the content to be adjusted based on the speed of the electronic device.

The processor may be configured to adjust the position of the virtual image corresponding to the content by adjusting a distance between an image for the left eye corresponding to the content and an image for the right eye corresponding to the content based on the speed of the electronic device.

According to an embodiment, an electronic device may include a sensor module, a display, and a processor configured to identify at least one of an ambient illuminance of the electronic device or a speed of the electronic device using the sensor module and adjust a position of a virtual image corresponding to content displayed through the display based on at least one of the ambient illuminance or speed of the electronic device.

The processor may be configured to, when the ambient illuminance of the electronic device is within a first illuminance range, change the position of the virtual image to a first display region corresponding to the first illuminance range, and when the ambient illuminance of the electronic device is within a second illuminance range, change the position of the virtual image to a second display region corresponding to the second illuminance range.

When the second illuminance range corresponds to an illuminance higher than the first illuminance range, the first display region may correspond to a first FOV, and the second display region may correspond to a second FOV having a broader view angle and a shorter focal length than the first FOV.

The processor may be configured to, when the identified speed is within a first speed range, change the position of the virtual image to a third display region corresponding to the first speed range, and when the identified speed is within a second speed range, change the position of the virtual image to a fourth display region corresponding to the second speed range.

When the second speed range corresponds to a speed higher than the first speed range, the first display region may correspond to a first FOV, and the second display region may correspond to a second FOV having a narrower view angle and a longer focal length than the first FOV.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

As is apparent from the foregoing description, according to various embodiments of the disclosure, an electronic device may automatically adjust the position and/or size of content displayed on a display by identifying at least one of the ambient illuminance and speed of the electronic device, increasing availability and stability.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A wearable electronic device in the form of glasses, comprising:
   a memory configured to store content;
   a first sensor configured to sense an illuminance;
   a display module configured to produce image light related to the content;
   a virtual display area configured to display the image light in a glass plate of the wearable electronic device; and
   a processor configured to:
   control the display module to produce the image light related to the content such that the content is displayed according to a first field of view (FOV) of a user in the virtual display area;
   identify, using the first sensor, whether an ambient illuminance of the wearable electronic device is greater than a first preset illuminance; and
   in response to identifying that the ambient illuminance is greater than the first preset illuminance, control the display module to produce the image light related to the content such that the content is displayed according to a second FOV of the user in the virtual display area,
   wherein the second FOV has a broader view angle than the first FOV, and
   wherein, when the content is displayed according to the second FOV, the content is displayed in a second area of the virtual display area broader than a first area of the virtual display area used in the first FOV.

2. The wearable electronic device of claim 1, wherein the processor is further configured to:
   control the display module to produce the image light related to the content such that the content is displayed according to a first focal length of a user in the virtual display area;
   identify, using the first sensor, whether the ambient illuminance of the wearable electronic device is greater than the first preset illuminance; and
   in response to identifying that the ambient illuminance is greater than the first preset illuminance, control the display module to produce the image light related to the content such that the content is displayed according to a second focal length of the user in the virtual display area,
   wherein the second focal length is shorter than the first focal length.

3. The wearable electronic device of claim 1, wherein the processor is further configured to:
   identify, using the first sensor, whether an ambient illuminance of the wearable electronic device is less than a second preset illuminance; and
   in response to identifying that the ambient illuminance is less than the second preset illuminance, control the display module to produce the image light related to the content such that the content is displayed according to a third FOV of the user in the virtual display area,
   wherein the third FOV has a narrower view angle than the first FOV, and
   wherein, when the content is displayed according to the third FOV, the content is displayed in a third area of the virtual display area narrower than the first area of the virtual display area used in the first FOV.

4. The wearable electronic device of claim 1, wherein the processor is further configured to:
   control the display module to produce the image light related to the content such that the content is displayed according to a first focal length of a user in the virtual display area;
   identify, using the first sensor, whether the ambient illuminance of the wearable electronic device is less than a second preset illuminance; and
   in response to identifying that the ambient illuminance is less than the second preset illuminance, control the display module to produce the image light related to the content such that the content is displayed according to a third focal length of the user in the virtual display area,
   wherein the third focal length is longer than the first focal length.

5. The wearable electronic device of claim 1, further comprising a second sensor configured to sense a speed, wherein the processor is further configured to:
   identify, using the second sensor, whether a speed of the wearable electronic device is greater than a first preset speed; and
   in response to identifying that the speed is greater than the first preset speed, control the display module to produce the image light related to the content such that the content is displayed according to a fourth FOV of the user in the virtual display area,
   wherein the fourth FOV has a narrower view angle and a longer focal length than the first FOV, and
   wherein when the content is displayed according to the fourth FOV, the content is displayed in a fourth area of the virtual display area narrower than the first area of the virtual display area used in the first FOV.

6. The wearable electronic device of claim 5, wherein the processor is further configured to:

identify, using the second sensor, whether a speed of the wearable electronic device is less than a second preset speed; and in response to identifying that the speed is less than the second preset speed, control the display module to produce the image light related to the content such that the content is displayed according to a fifth FOV of the user in the virtual display area, wherein the fifth FOV has a broader view angle and a shorter focal length than the first FOV, and wherein, when the content is displayed according to the fifth FOV, the content is displayed in a fifth area of the virtual display area broader than the first area of the virtual display area used in the first FOV.

7. A method of operating a wearable electronic device in a form of glasses, comprising:

controlling a display module included in the wearable electronic device to produce an image light related to content stored in the wearable electronic device such that the content is displayed according to a first field of view (FOV) of a user in the virtual display area;

identifying, using a first sensor included in the wearable electronic device, whether an ambient illuminance of the wearable electronic device is greater than a first preset illuminance; and in response to identifying that the ambient illuminance is greater than the first preset illuminance, controlling the display module to produce the image light related to the content such that the content is displayed according to a second FOV of the user in the virtual display area, wherein the second FOV has a broader view angle than the first FOV, and wherein, when the content is displayed according to the second FOV, the content is displayed in a second area of the virtual display area broader than a first area of the virtual display area used in the first FOV.

8. The method of claim 7, further comprising:

controlling the display module to produce the image light related to the content such that the content is displayed according to a first focal length of a user in the virtual display area;

identifying, using the first sensor, whether the ambient illuminance of the wearable electronic device is greater than the first preset illuminance; and in response to identifying that the ambient illuminance is greater than the first preset illuminance, controlling the display module to produce the image light related to the content such that the content is displayed according to a second focal length of the user in the virtual display area, wherein the second focal length is shorter than the first focal length.

9. The method of claim 7, further comprising:

identifying, using the first sensor, whether an ambient illuminance of the wearable electronic device is less than a second preset illuminance; and in response to identifying that the ambient illuminance is less than the second preset illuminance, controlling the display module to produce the image light related to the content such that the content is displayed according to a third FOV of the user in the virtual display area, wherein the third FOV has a narrower view angle than the first FOV, and wherein, when the content is displayed according to the third FOV, the content is displayed in a third area of the virtual display area narrower than the first area of the virtual display area used in the first FOV.

10. The method of claim 7, further comprising:

controlling the display module to produce the image light related to the content such that the content is displayed according to a first focal length of a user in the virtual display area;

identifying, using the first sensor, whether the ambient illuminance of the wearable electronic device is less than a second preset illuminance; and in response to identifying that the ambient illuminance is less than the second preset illuminance, controlling the display module to produce the image light related to the content such that the content is displayed according to a third focal length of the user in the virtual display area, wherein the third focal length is longer than the first focal length.

11. The method of claim 7, further comprising:

identifying, using a second sensor included in the wearable electronic device, whether a speed of the wearable electronic device is greater than a first preset speed; and in response to identifying that the speed is greater than the first preset speed, controlling the display module to produce the image light related to the content such that the content is displayed according to a fourth FOV of the user in the virtual display area, wherein the fourth FOV has a narrower view angle and a longer focal length than the first FOV, and wherein, when the content is displayed according to the fourth FOV, the content is displayed in a fourth area of the virtual display area narrower than the first area of the virtual display area used in the first FOV.

12. The method of claim 11, further comprising:

identifying, using the second sensor, whether a speed of the wearable electronic device is less than a second preset speed; and in response to identifying that the speed is less than the second preset speed, controlling the display module to produce the image light related to the content such that the content is displayed according to a fifth FOV of the user in the virtual display area, wherein the fifth FOV has a broader view angle and a shorter focal length than the first FOV, and wherein, when the content is displayed according to the fifth FOV, the content is displayed in a fifth area of the virtual display area broader than the first area of the virtual display area used in the first FOV.

* * * * *